3,646,084
METHOD OF MAKING IMIDATOSILANES
Milton L. Evans, Schenectady, Tyrone D. Mitchell, Troy, and Terry G. Selin, Schenectady, N.Y., assignors to General Electric Company
No Drawing. Filed Sept. 16, 1970, Ser. No. 72,853
Int. Cl. C07f 7/10, 7/18
U.S. Cl. 260—448.2 E          13 Claims

ABSTRACT OF THE DISCLOSURE

Imidatosilanes are prepared by reacting an imidate with a chlorosilane in an inert organic solvent and in the presence of an amine acid acceptor. The amine salt which is formed as a by-product of the reaction is removed from the imidatosilane which is formed by extracting it with water.

CROSS REFERENCE TO RELATED APPLICATIONS

This patent application discloses a method of making imidatosilanes. The imidatosilanes produced are the subject matter of application Ser. No. 807,417, filed Mar. 14, 1969 and copending herewith.

BACKGROUND OF THE INVENTION

This invention relates to a method of preparing imidatosilanes which are useful in the preparation of one-package room temperature vulcanizing compositions.

A large body of art exists in the field of one-package room temperature vulcanizable polysiloxanes. These materials are prepared from two components—one of the components is a long polysiloxane chain having reactive terminal groups and the second component is a silane-containing at least three hydrolyzable radicals. When the composition is exposed to the atmosphere, the moisture from the atmosphere hydrolyzes the hydrolyzable radicals from the composition allowing condensation to form a cured elastomer.

Examples of silanes which can be employed to make the one-package room temperature vulcanizable polysiloxanes are the acetoxy-substituted silanes and the amine-substituted silanes. The acetoxy-substituted silanes are produced by reacting a trichlorosilane with acetic anhydride. Acetyl chloride is produced as a by-product. The amine-substituted silanes are produced by reacting amines with chlorosilanes and an amine hydrochloride is produced as a by-product. The presence of the acetyl chloride interferes with the cure of the room temperature vulcanizing product and the presence of the amine hydrochloride in the product seriously affects the heat-age properties of the product. At high temperatures, the amine hydrochloride breaks down into the amine and this combination destroys the polysiloxane. It is essential that the room temperature vulcanizable materials described above be free of extraneous materials such as the acetyl chloride or the amine hydrochloride. Removal of these materials involves difficult separation procedures such as forming a salt and filtering or fraction distillation.

The present invention is based upon the discovery that amine salts or the other harmful salts formed in the manufacture of moisture hydrolyzable imidatosilanes can be removed by water washing without hydrolyzing the imidatosilane.

DESCRIPTION OF THE PREFERRED EMBODIMENTS

The method of preparing imidatosilanes comprises reacting an organic compound selected from the group consisting of (1) an imidate and (2) a mixture of an imidate and an alcohol with a silane of the formula:

in a water-insoluble inert organic media in the presence of an acid acceptor. The imidate is preferably employed in excess. This is followed by a washing step with water which removes the salt formed by the reaction of the halogen with the acid acceptor. The process of this invention can be represented by the following synthesis:

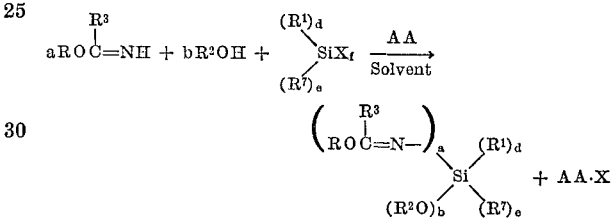

wherein $R^1$ and $R^7$ are each organic radicals of not more than 18 carbon atoms selected from the group consisting of hydrogen, hydrocarbyl, halohydrocarbyl and cyanoalkyl, R and $R^2$ are each organic radicals of not more than 18 carbon atoms selected from the group consisting of hydrocarbyl, halohydrocarbyl, nitrohydrocarbyl and alkoxyhydrocarbyl, $R^3$ is an organic radical of not more than 18 carbon atoms selected from the group consisting of hydrogen, hydrocarbyl, halohydrocarbyl, nitrohydrocarbyl, alkoxyhydrocarbyl, dialkylamino

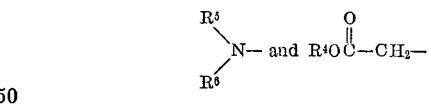

wherein $R^4$ is an organic radical selected from the group consisting of aliphatic hydrocarbyl, aliphatic halohydrocarbyl and aliphatic nitrohydrocarbyl, $R^5$ and $R^6$ are each aliphtic hydrocarbyl, X is halogen (Cl, Br, F or I) and preferably Cl, $a$ is an integer of 1 to 4, inclusive, and is preferably greater than $f$, $b$ is an integer of 0 to 3, inclusive, $d$ and $e$ are each integers of 0 or 1, and the sum of $a$, $b$, $d$ and $e$ is 4, and $f$ is an integer from 2 to 4, inclusive.

The term hydrocarbyl as used herein means a hydrocarbon from which one hydrogen atom has been removed, i.e., a monovalent hydrocarbon radical.

In the above formula, preferably, $R^1$ and $R^7$ are H, phenyl or alkyl of not more than 4 carbon atoms, R and $R^2$ are phenyl or alkyl or allyl or alkoxyalkyl of not more than 8 carbon atoms and $R^3$ is phenyl or alkyl of not more than 4 carbon atoms.

In the above formula, R and $R^2$ can be, for example, mononuclear and binuclear aryl, such as phenyl, naphthyl, benzyl, tolyl, xylyl, 2,6-di-t-butylphenyl, 4-butylphenyl, 2,4,6-trimethylphenyl, biphenyl and ethylphenyl; halogen-substituted mononuclear and binuclear aryl such as 2,6-dichlorophenyl, 4-bromophenyl, 2,5-difluorophenyl, 4,4'-dichlorobiphenyl, 2'-chloronaphthyl, 2,4,6-trichlorophenyl and 2,5 - dibromophenyl; nitro-substituted mononuclear and binuclear aryl such as 4 - nitrophenyl and 2,6-dinitrophenyl; alkoxy-substituted mono and binuclear aryl such as 4-methoxyphenyl, 2,6 - dimethoxyphenyl, 4-t-butoxyphenyl, 2 - ethoxyphenyl, 2 - ethoxynaphthyl and 2,4,6 - trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl, dodecyl and the various alkyls of not more than 18 carbon atoms, alkenyl such as vinyl, allyl, n-butenyl-1, n-butenyl-2, n-hexenyl-2, n-pentenyl-2, 2,3 - dimethylbutenyl-2, n-heptenyl, n-decenyl, n-dodecenyl and the various alkenyls of not more than 18 carbon atoms; alkynyl such as propargyl, 2-butynyl and the various alkynyls of not more than 18 carbon atoms; haloalkyl such as chloromethyl, iodoethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoiso-propyl, bromo-n-butyl, bromo-tert-butyl, 1,3,3 - trichlorobutyl, 1,3,3-tribromobutyl, chloropentyl, bromopentyl, 2,3 - dichloropentyl, 3,3 - dibromopentyl, chlorohexyl, bromohexyl, 2,4 - dichlorohexyl, 1,3 - dibromohexyl, 1,2,4 - trichlorohexyl, chloroheptyl, bromoheptyl, fluoroheptyl, 1,3 - dichloroheptyl, 1,4,4 - trichloroheptyl, 2,4 - dichloromethylheptyl, chlorooctyl, bromooctyl, iodooctyl, 2,4 - dichloromethylhexyl, 2,4 - dichlorooctyl, 2,4,4 - trichloromethylpentyl, 1,3,5 - tribromooctyl and the various haloalkyls of not more than 18 carbon atoms; haloalkenyls such as chlorovinyl, bromovinyl, chloroallyl, bromoallyl, 3-chloro-n-butenyl - 1,3-chloro-n-pentenyl-1, 3-fluoro-n-heptenyl-1, 1,2,2 - trichloro-n-heptenyl - 5, 1,25 - trichloro-n-octenyl-6, 2,3,3 - trichloromethylpentenyl-4 and the various haloalkenyls of not more than 18 carbon atoms; haloalkynyls such as chloropropargyl, bromopropargyl and the various haloalkynyls of not more than 18 carbon atoms, nitroalkyl such as nitromethyl, nitroethyl, nitro-n-propyl, nitro-n-butyl, nitropentyl, 1,3 - dinitroheptyl and the various nitroalkyls of not more than 18 carbon atoms; nitroalkenyl such as nitroallyl, 3-nitro-n-butenyl-1, 3-nitro-n-heptenyl-1 and the various nitroalkenyls of not more than 18 carbon atoms; nitroalkynyl such as nitropropargyl and the various nitroalkynyls of not more than 18 carbon atoms; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl, ethoxyethoxy and the various alkoxyalkyls and polyalkoxyalkyls of not more than 18 carbon atoms; alkoxyalkenyl and polyalkoxyalkenyl such as ethoxyvinyl, methoxyallyl, butoxyallyl, methoxy-n-thoxy-n-butenyl - 1, butoxy-n-pentenyl - 1, methoxyethoxy-n-heptenyl - 1, and the various alkoxyalkenyls and polyalkoxyalkenyls of not more than 18 carbon atoms; alkoxyalkynyl and polyalkoxyalkynyl such as methoxypropargyl and the various alkoxyalkynyls and polyalkoxyalkynyls of not more than 18 carbon atoms; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6 - methyl-cyclohexyl, 2,5 - dimethylcycloheptyl, 4 - butylcyclopentyl, 3,4 - dichlorocyclohexyl, 2,6 - dibromocycloheptyl, 6-methoxycyclooctyl, 2 - nitrocyclopentyl, 1 - cyclopentenyl, 3 - methyl - 1 - cyclopentenyl, 5 - methoxy-1-cyclopentenyl, 3,4 - dimethyl - 1 - cyclopentenyl, 2,5 - dimethoxy-1-cyclopentenyl - 5 - methyl - 5 - cyclopentenyl, 3,4 - dichloro - 5 - cyclopentenyl, 5 - (tert-butyl)-1-cyclopentenyl, 2 - nitro - 1 - cyclohexenyl, 1 - cyclohexenyl, 3 - methyl-1 - cyclohexenyl, 3,4 - dimethyl - 1 - cyclohexenyl, 6-methoxy-1-cyclohexenyl and the like.

In the above, the hydrocarbyl and substituted hydrocarbyl of $R^3$, $R^4$, $R^5$ and $R^6$ can be those listed above for R and $R^2$.

In the above, $R^1$ and $R^7$ can be hydrogen, hydrocarbyl and halohydrocarbyl such as those listed above for R and $R^2$, and cyanoalkyl such as cyanomethyl, cyanoethyl, cyanobutyl, cyanoisobutyl and the various isomers and homologs of cyanoalkyl of not more than 18 carbon atoms; X is halogen (Cl, Br, F or I) and AA is an acid acceptor. In carrying out the process of this invention, the organic compound and the silane can be added separately or concomitantly to the reaction vessel in the required amounts or a molar excess of either reactant can be used. If excess reactant is employed, it is preferred that it be the organic compound since it will serve as a reaction medium and is easily separated from the product. Temperature of reaction for the process of this invention is not critical and good results can generally be obtained at a temperature from about 0° C. to about 100° C. Temperatures from about 25° C. to about 80° C. are preferred.

The process is carried out in the presence of an inert organic medium. The organic medium which can be employed in the process of this invention can be any of the well known solvents and diluents which are inert to the reactants and insoluble in water. For example, acyclic hydrocarbons such as hexane, isooctane, decane, etc., aromatic hydrocarbons such as benzene, toluene and xylene, ethers such as diethylether and dibutylether and cyclic hydrocarbons such as cyclohexane; halogenated hydrocarbons, such as chlorobenzene and dichlorobenzene; and water insoluble nitriles such as benzonitrile can be used.

The quantity of the inert organic media is not critical and may constitute from 40 to 90 or more weight percent of the solution. It is preferred that 60 percent to 80 percent by weight of inert organic media be employed.

The separation of the product from the reaction mixture is readily accomplished by adding water to the solution of the imidatosilane. The process can be carried out in the absence of the solvent, followed by dissolving the imidatosilane in the solvent, but no purpose is served thereby. Sufficient water is added to dissolve all of the salt formed by the acid acceptor and preferably at least a two-fold excess, based upon the solubility of the salt in the water. This, generally speaking, would constitute from 10% to 90% of the total weight of the reaction mixture plus water and preferably from 15% to 75%.

The separation is to be accomplished at a temperature below 35° C. and preferably below 25° C.

Pressure is not a critical factor in the process of this invention. Pressure both above and below atmospheric pressure may be employed, although atmospheric pressure is preferred for convenience.

When a highly volatile acid acceptor such as trimethylamine is used in the process, a pressure above atmospheric pressure may be employed. In the alternative, the addition rate may be varied to prevent escape of the volatile material due to limited solubility. For instance, in the case of trimethylamine, the trimethylamine can be bubbled into the reaction system slowly so that the rate at which it accepts excess acid is approximately the same as the rate into which it is introduced into the system. This will maintain the concentration of the trimethylamine at a low level and prevent excessive volatilization.

Acid acceptors which can be used in the process of this invention include the following representative materials. Inorganic bases, for example, alkali-metal hydroxides such as lithium hydroxide, sodium hydroxide, potassium hydroxide, rubidium hydroxide and cesium hydroxide; alkaline earth metal hydroxides such as calcium hydroxide and barium hydroxide; alkali-metal hydrides such as sodium hydride, potassium hydride and lithium hydride; metallic oxides such as calcium oxide, magnesium oxide, silver oxide and barium oxide; alkali-metal and alkaline earth metal carbonates such as sodium carbonate, potassium carbonate, magnesium carbonate, calcium carbonate and barium carbonate, and ammonia and ammonia producing compounds such as ammonium hydroxide and ammonium carbonate; and organic bases, for example, aliphatic and aromatic alkoxides such as sodium methoxide, potassium methoxide, lithium methoxide, sodium ethoxide, potassium ethoxide, lithium butoxide, sodium butoxide, sodium phenoxide, lithium phenoxide and potassium phenoxide; tertiary amines such as trimethylamine, triethylamine, tri-n-propylamine, triisopropylamine, tri-n-butylamine, triisobutylamine, tri-sec-butylamine, tri-n-amylamine, triisoamylamine, trihexylamine, triheptylamine and trioctylamine; heterocyclic amines such as pyridine; and mercaptides such as sodium methylmercaptide, sodium ethylmercaptide, potassium methylmercaptide and potassium phenylmercaptide.

The preferred acid acceptors are the tertiary amines as they are strong acid acceptors and do not react with chlorosilanes.

The imidates used to form the imidatosilanes can also act as acid acceptors but due to the high cost of these materials, this is not the preferred method.

The following examples will further illustrate the invention. Parts and percents are by weight unless otherwise indicated.

Example 1

To 268 parts of hexane in a reactor having a bottom outlet was added 87 parts of ethylacetimidate and 101 parts of triethylamine. The reactor was heated to 50° C. and 50 parts of methyltrichlorosilane was added dropwise at such a rate that the reaction temperature did not rise above 60° C. At the end of the silane addition, the reaction mixture was refluxed at 70° C. for two hours. It was then cooled to less than 20° C. and 200 parts of water was added rapidly with stirring. The reaction temperature rose to 25° C. At the end of a 10 minute agitation period, the lower water layer containing triethylamine hydrochloride was drained off and the upper hexane layer dried over anhydrous magnesium sulfate. The hexane solution was filtered and the solvent was distilled away from the product. The residue, a clear white liquid, was analyzed by infrared and gas chromatographic analysis and identified as methyl-tris-ethylacetimidatosilane. The yield was 50% of theoretical.

Example 2

To 268 parts of hexane in a reactor having a bottom outlet was added 87 parts of ethylacetimidate and 202 parts of triethylamine. The reactor was heated to 50° C. and 73 parts of a mixture of methylchlorodimethoxysilane, methyltrichlorosilane and methyldichloromethoxysilane was added dropwise over a 15 minute period. The reaction temperature was kept at 50° C. and at the end of the chlorosilane addition it was refluxed at 73° C. for one hour. It was then cooled to 10° C. and 250 parts of water was added over a three minute period while the temperature of the reaction mixture increased from 10° C. to 14° C. The bottom water layer was then separated and the upper hexane layer was dried over anhydrous magnesium sulfate. From the separation was obtained 385 parts of an aqueous phase and 484 parts of an organic phase. After the organic phase was filtered, the solvent was distilled off and the residue obtained was identified by gas chromatography, as a mixture of 22% methyldimethoxyethylacetimidatosilane, 62% methylmethoxy-bis-ethylacetimidatosilane and 16% of methyltris-ethylacetimidatosilane. The product mixture titrated 62.5% imidate. The yield was 77.5% of theoretical.

Example 3

Into a mixture of 600 parts of isopropanol, 410 parts of acetonitrile and 920 parts of toluene, was bubbled slowly 365 parts of anhydrous hydrogen chloride. When the theoretical amount of hydrogen chloride was added, the solution contained 13.8 weight percent hydrogen chloride. The process of the reaction was determined by withdrawing samples and titrating for percent hydrogen chloride. The reaction mixture was stirred at room temperature for 15 hours. Analysis by nuclear magnetic resonance showed the following results; 40.28 weight percent toluene, 7.755 weight percent acetonitrile, 11.05 weight percent isopropanol and 41.25 weight percent isopropylacetimidate hydrochloride. This solution of the imidate hydrochloride was a homogeneous clear, slightly viscous liquid. The imidate hydrochloride remained in solution. Neutralization of the imidate hydrochloride from the reaction carried out above was done in the following manner. The reaction mixture which contained 15.8 percent hydrogen chloride was neutralized with a 20 percent solution of potassium carbonate. A solution of 727 parts of potassium carbonate and 2913 parts of water was added rapidly to 1200 parts of the reaction mixture containing 41.25 weight percent isopropylacetimidate hydrochloride. The potassium carbonate solution, being added rapidly, produced a temperature increase to 37° C. but because of the escaping carbon dioxide the temperature dropped to 24° C. At the end of the carbon dioxide evolution, two layers separated. The lower aqueous potassium chloride layer was separated and discarded. The upper toluene layer was steam heated to reflux and 30 percent was flash distilled to remove water and isopropanol by azeotropic distillation. There was originally 700 parts of toluene solution. The remaining solution contained 25.1 percent of isopropylacetimidate when analyzed by titration with perchloric acid. To 450 parts of the solution containing 25.1 percent isopropylacetimidate was added 111 parts of triethylamine. An additional 129 parts of toluene was added over a 15 minute period and 54 parts of methyltrichlorosilane was added. At the end of the addition the reaction mixture was heated to 60° C. and held at that temperature for 30 minutes. It was then held at 25° C. and 800 parts of water was added while stirring vigorously. After layer separation, the lower aqueous layer containing the triethylamine hydrochloride was discarded. The upper toluene layer was flash distilled yielding 90 parts of product which was analyzed to be methyl-tris-isopropylacetimidatosilane.

Examples 4 through 42

Example 3 was repeated in the examples set forth in the following tables. The heading "Percent Free Imidate of Solution" refers to the concentration of the free imidate which is used to form the imidatosilane in the solvent in which it is dissolved. The column headed "Wt. Percent Solvent" refers to the solvent and the amount of solvent in which the imidate solution is placed to effect the reaction of the imidate with the chlorosilane.

In the table, "Et" represents ethyl, "Me" represents methyl, and under the heading "Grams $H_2O$ Used," when aliquot portions were used both the number and the quantities of each portion are indicated.

| Examples | 4 | 5 | 6 | 7 | 8 | 9 |
|---|---|---|---|---|---|---|
| Silane used | MeSiCl$_3$ | MeSiCl$_3$ | MeSi(OMe)$_{1.5}$Cl$_{1.5}$ | MeSi(OMe)$_{1.5}$Cl$_{1.5}$ | MeSi(OMe)Cl$_2$ | MeSi(OMe)Cl$_2$ |
| Alkylacetimidate used | Ethyl | Ethyl | Ethyl | Ethyl | Ethyl | Ethyl |
| Moles imidate/moles Silane | 1.0/0.33 | 1.0/0.33 | 1.0/0.67 | 1.0/0.67 | 1.0/0.50 | 1.0/0.50 |
| HCl acceptor | Et$_3$N | Et$_3$N | Et$_3$N | Et$_3$N | Et$_3$N | Et$_3$N (1 mole excess) |
| Wt. percent solvent in reaction mixture | 53-hexane | 53-hexane | 53-hexane | 53-hexane | 53-hexane | 53-hexane |
| Wt. free imidate of solution | 80% toluene | 80% toluene | 91% toluene | 91% toluene | 91% toluene | 91% toluene |
| Reaction temperature, °C | 50–60 | 40–50 | 40–50 | 40–50 | 50–70 | 50–70 |
| Water addition temp-temperature, °C | 12 | 10 | 22 | 7 | 10 | 10 |
| Grams H$_2$O used | 100 | 200 | 300 | 250 | 250 | 250 |
| Percent imidate of solvent distillate | | 17.07 | 15.4 | 9.94 | 5.44 | 31.7 |
| Percent imidate of product residue | 78.7 | 74.2 | 48 | 52 | 63 | 62.5 |
| Percent yield (based on silane) | 46 | 49.5 | 42 | 61 | 69.2 | 74.8 |

| Examples | 10 | 11 | 12 | 13 | 14 | 15 | 16 |
|---|---|---|---|---|---|---|---|
| Silane used | MeSi(OMe)Cl$_2$ | MeSi(OMe)Cl$_2$ | MeSiCl$_3$ | MeSi(OMe)Cl$_2$ | MeSiCl$_3$ | MeSiCl$_3$ | MeSiCl$_3$ |
| Alkylacetimidate used | Ethyl | Ethyl | Isopropyl | Isopropyl | Isopropyl | Isopropyl | Isopropyl |
| Moles imidate/moles silane | 1.0/0.50 | 1.0/0.50 | 1.0/0.33 | 1.0/0.50 | 5.13/1.68 | 6.21/2.09 | 0.495/0.165 |
| HCl acceptor | Et$_3$N | Et$_3$N (1 mole excess) | Et$_3$N | Et$_3$N | Et$_3$N | Et$_3$N | Et$_3$N |
| Wt. percent solvent in reaction mixture | 50-Et$_3$N | 49% toluene | 50% hexane | 50% hexane | 52% hexane | 52% hexane | 52% hexane |
| Wt. free imidate of solution | 91% toluene | 91% toluene | 28% hexane | 28% hexane | 37% hexane | 49% hexane | 33.6% hexane |
| Reaction temperature, °C | 50–95 | 50–95 | 60–70 | 50–60 | 50–60 | 50–60 | 50–60 |
| Water addition temperature, °C | 18 | 10 | 35 | 15 | 15 | 22 | 19 |
| Grams H$_2$O used | 250 | 250 | 250 | 250 | 1,500 | 2,000 | 300 |
| Percent imidate of solvent distillate | 94.9 | 23 | 11.2 | 19.8 | | 19.9 | 11.05 |
| Percent imidate of product residue | 75.3 | 63 | 75 | 66 | 78.7 | 73.5 | 59.4 |
| Percent yield (based on silane) | 66.7 | 63.5 | 69.2 | 74 | 78.2 | 54.3 | 48 |

| Examples | 17 | 18 | 19 | 20 | 21 | 22 | 23 |
|---|---|---|---|---|---|---|---|
| Silane used | MeSiCl$_3$ | MeSiCl$_3$ | MeSiCl$_3$ | MeSiCl$_3$ | MeSiCl$_3$ | MeSiCl$_3$ | MeSiCl$_3$ |
| Alkylacetimidate used | Isopropyl | Isopropyl | Isopropyl | Isopropyl | Isopropyl | Isopropyl | Isopropyl |
| Moles imidate/moles silane | 7.40/2.42 | 8.90/2.97 | 5.0/1.65 | 2.97/0.99 | 2.97/0.99 | 3.96/1.30 | 3.66/1.19 |
| HCl acceptor | Et$_3$N | Et$_3$N | Et$_3$N | Et$_3$N | Et$_3$N | Et$_3$N | Et$_3$N |
| Wt. percent solvent in reaction mixture | 52% hexane | 61% hexane-pentane | 45% hexane-pentane | 51% hexane | 51% hexane | 63% hexane | 62% hexane |
| Wt. free imidate of solution | 31.2% hexane | 47% pentane | 45% hexane-pentane | 28.5% hexane | 28.5% hexane | 28.3% hexane | 28.3% hexane |
| Reaction temperature, °C | 40–50 | 50–60 | 50–60 | 50–60 | 50–60 | 50–60 | 50–60 |
| Water addition temperature, °C | 14 | 10 | 28 | | 18 | 15 | 15 |
| Grams H$_2$O used | 2,000 | 2,000 | 1,500 | 2,000 | 1,000 | 1,000 | 1,000 |
| Percent imidate of solvent distillate | | | | 6.97 | 8.15 | 5.9 | 7.38 |
| Percent imidate of product residue | 80.8 | 78 | 78.7 | 82.4 | 84 | 83.6 | 84.3 |
| Percent yield (based on silane) | 74.4 | 63.2 | 62 | 44.2 | 32 | 74.4 | 63 |

| Examples | 24 | 25 | 26 | 27 | 28 | 29 | 30 |
|---|---|---|---|---|---|---|---|
| Silane used | MeSiCl$_3$ | CH$_2$=CHSiCl$_3$ | MeSiCl$_3$ | MeSiCl$_3$ | MeSiCl$_3$ | MeSiCl$_3$ | MeSiCl$_3$ |
| Alkylacetimidate used | Isopropyl | Isopropyl | Isopropyl | Isopropyl | Isopropyl | Isopropyl | Isopropyl |
| Moles imidate/moles silane | 4.94/1.58 | 2.21/0.735 | 4.72/1.58 | 4.90/1.58 | 4.91/1.58 | 0.495/0.160 | 0.495/0.160 |
| HCl acceptor | Et$_3$N | Et$_3$N | Et$_3$N | Me$_2$NCH$_2$CH$_2$NMe$_2$ (1 mole excess) | Me$_2$NCH$_2$CH$_2$NMe$_2$ | Et$_3$N | Et$_3$N |
| Wt. percent solvent in reaction mixture | 62% hexane | 62% hexane | 62% hexane | 62% hexane | 62% hexane | 62% hexane | 62% hexane |
| Wt. free imidate of solution | 28.3% hexane | 28.3% hexane | 28.3% hexane | 28.3% hexane | 28.3% hexane | 28.3% hexane | 28.3% hexane |
| Reaction Temperature, °C | 50–60 | 50–60 | 50–60 | 50–60 | 50–60 | 50–60 | 50–60 |
| Water addition temperature, °C | 15 | 15 | 15 | 15 | 15 | 15 | 15 |
| Grams H$_2$O used | 1,000 | 1,000 | 1,000 | 1,000 | 1,000 | 2×250 | 2×100 |
| Percent imidate of solvent distillate | 5.45 | 2.98 | 12.52 | 8.89 | 8.13 | 5.68 | 3.65 |
| Percent imidate of product residue | 83.08 | 81.1 | 81.7 | 82.08 | 83.13 | 85.8 | 84.9 |
| Percent yield (based on silane) | 74.2 | 68 | 39.7 | 64 | 45.7 | 56.3 | 76.3 |

| Examples | 31 | 32 | 33 | 34 | 35 | 36 |
|---|---|---|---|---|---|---|
| Silane used | MeSiCl$_3$ | MeSiCl$_3$ | MeSiCl$_3$ | MeSi(OMe)Cl$_2$ | MeSi(OMe)Cl$_2$ | MeSi(OMe)Cl$_2$. |
| Alkylacetimidate used. | Isopropyl | Isopropyl | Isopropyl | Isopropyl | Isopropyl | Isopropyl. |
| Moles imidate/moles silane. | 0.495/0.160 | 0.495/0.160 | 0.795/0.160 | 3.30/1.50 | 3.30/1.58 | 4.06/1.93. |
| HCl acceptor | Et$_3$N | Et$_3$N | Et$_3$N | Et$_3$N | Et$_3$N | Et$_3$N. |
| Wt. percent solvent reaction mixture. | 62% hexane | 62% hexane | 62% hexane | 62% hexane | 62% hexane | 60% hexane. |
| Wt. free imidate of solution. | 28.3% hexane | 28.3% hexane | 28.3 hexane | 28.3% hexane | 28.3% hexane | 28.3% hexane. |
| Reaction temperature, °C. | 50–60 | 50–60 | 50–60 | 50–60 | 50–60 | 50–60. |
| Water addition temperature, °C. | 15 | 15 | 15 | 20 | 15 | 15. |
| Grams H$_2$O used | 2×50 | 3×100 | 300 | 2×500 | 2×500 | 2×500. |
| Percent imidate of solvent distillate. | 53.51 | 3.76 | 6.14 | 8.09 | 12.53 | 13.1. |
| Percent imidate of product residue. | 77.7 | 84.9 | 83.9 | 76.4 | 66.3 | 68.6. |
| Percent yield (based on silane). | 52.6 | 83.5 | 67 | 43 | 47.6 | 60. |

| Examples | 37 | 38 | 39 | 40 | 41 | 42 |
|---|---|---|---|---|---|---|
| Silane used | MeSiCl$_3$ | MeSiCl$_3$ | MeSiCl$_3$ | MeSiCl$_3$ | MeSiCl$_3$ | MeSiCl$_3$. |
| Alkylacetimidate used. | Isopropyl | Isopropyl | Isopropyl | Isopropyl | Isopropyl | Isopropyl. |
| Moles imidate/moles silane. | 0.237/0.079 | 1.10/0.367 | 3.32/1.11 | 1.12/0.37 | 1.22/0.244 | 1.23/0.41. |
| HCl acceptor | Et$_3$N | Et$_3$N | Et$_3$N | Et$_3$N | Et$_3$N | Et$_3$N. |
| Wt. percent solvent in reaction mixture. | 67% toluene | 63% toluene | 61% toluene | 62% toluene | 62% toluene | 62% toluene. |
| Wt. free imidate of solution. | 19.9% toluene | 25.9% toluene | 32.4% toluene | 23.5% toluene | 26.3% toluene | 26.2% toluene. |
| Reaction temperature °C. | 50–70 | 50–70 | 50–70 | 60–70 | 50–70 | 50–70. |
| Water addition temperature, °C. | 25 | 25 | 25 | 25 | 25 | 25. |
| Grams H$_2$O used | 200 | 800 | 1,000 | 800 | 800 | 800. |
| Percent imidate of solvent distillate. | 9.4 | 8.07 | | | | 9.45. |
| Percent imidate of product residue. | 68 | 70 | 74.5 | 72 | 64.5 | 83.7. |
| Percent yield (based on silane). | 73.7 | 81.2 | 83.6 | 56 | 95.6 | 42.7. |

What we claim is:

1. A method of preparing imidatosilanes comprising reacting an organic compound selected from the class consisting of (1) an imidate and (2) a mixture of an imidate with an alcohol with a silane-containing halogen substituents in a water-insoluble inert organic media in the presence of an acid acceptor; washing the product with water to remove the salt formed by the reaction of the halogen with the acid acceptor and removing the water solution from the imidatosilane which is formed.

2. The method of claim 1 further characterized by the halosilane having the formula:

wherein R$^1$ and R$^7$ are each organic radicals of not more than 18 carbon atoms selected from the group consisting of hydrogen, hydrocarbyl, halohydrocarbyl and cyanoalkyl; X is Cl and d and e each have a value of 0 or 1 and f is 3.

3. The method of claim 2 further characterized by the imidate having the formula:

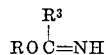

wherein R is an organic radical of not more than 18 carbon atoms selected from the group consisting of hydrocarbyl, halohydrocarbyl, nitrohydrocarbyl, and alkoxyhydrocarbyl, R$^3$ is an organic radical of not more than 18 carbon atoms selected from the group consisting of hydrogen, hydrocarbyl, halohydrocarbyl, nitrohydrocarbyl, alkoxyhydrocarbyl, dialkylamino,

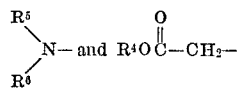

wherein R$^4$ is an organic radical selected from the group consisting of aliphatic hydrocarbyl, aliphatic halohydrocarbyl and aliphatic nitrohydrocarbyl and wherein R$^5$ and R$^6$ are each aliphatic hydrocarbyl and a is an integer of 1 to 4 and designates the ratio of imidate molecules to halosilane molecules.

4. The process of claim 3 further characterized by a being greater than f.

5. The process of claim 2 further characterized by the alcohol having the formula R$^2$OH where R$^2$ is an organic radical of not more than 18 carbon atoms selected from the group consisting of hydrocarbyl, halohydrocarbyl, nitrohydrocarbyl and alkoxyhydrocarbyl and the ratio of alcohol molecules to halosilane molecules has a value of 0 to 3.

6. The method of claim 1 further characterized by from 40 to 90 weight percent of water-insoluble inert organic media being present.

7. The process of claim 6 further characterized by from 60 to 80 weight percent of water-insoluble inert organic media being present.

8. The process of claim 1 further characterized by at least sufficient water being present to dissolve all of the salt formed by the acid acceptor.

9. The process of claim 1 further characterized by at least a two-fold excess of water based upon the solubility of the salt in water formed by the acid acceptor being present.

10. The process of claim 1 further characterized by the separation step being accomplished at a temperature below 35° C.

11. The process of claim 10 further characterized by the separation step being accomplished at a temperature below 25° C.

12. The process of claim 1 further characterized by the acid acceptor being tertiary amine.

13. The process of claim 1 further characterized by the acid acceptor being triethylamine.

References Cited

UNITED STATES PATENTS

| 3,529,017 | 9/1970 | Izard et al. | 260—448.2 N X |
| 3,558,741 | 1/1971 | Holub et al. | 260—448.2 N X |
| 3,576,031 | 4/1971 | Holub et al. | 260—448.2 N |

JAMES E. POER, Primary Examiner

P. F. SHAVER, Assistant Examiner

U.S. Cl. X.R.

260—448.2 N, 448.8 R